UNITED STATES PATENT OFFICE.

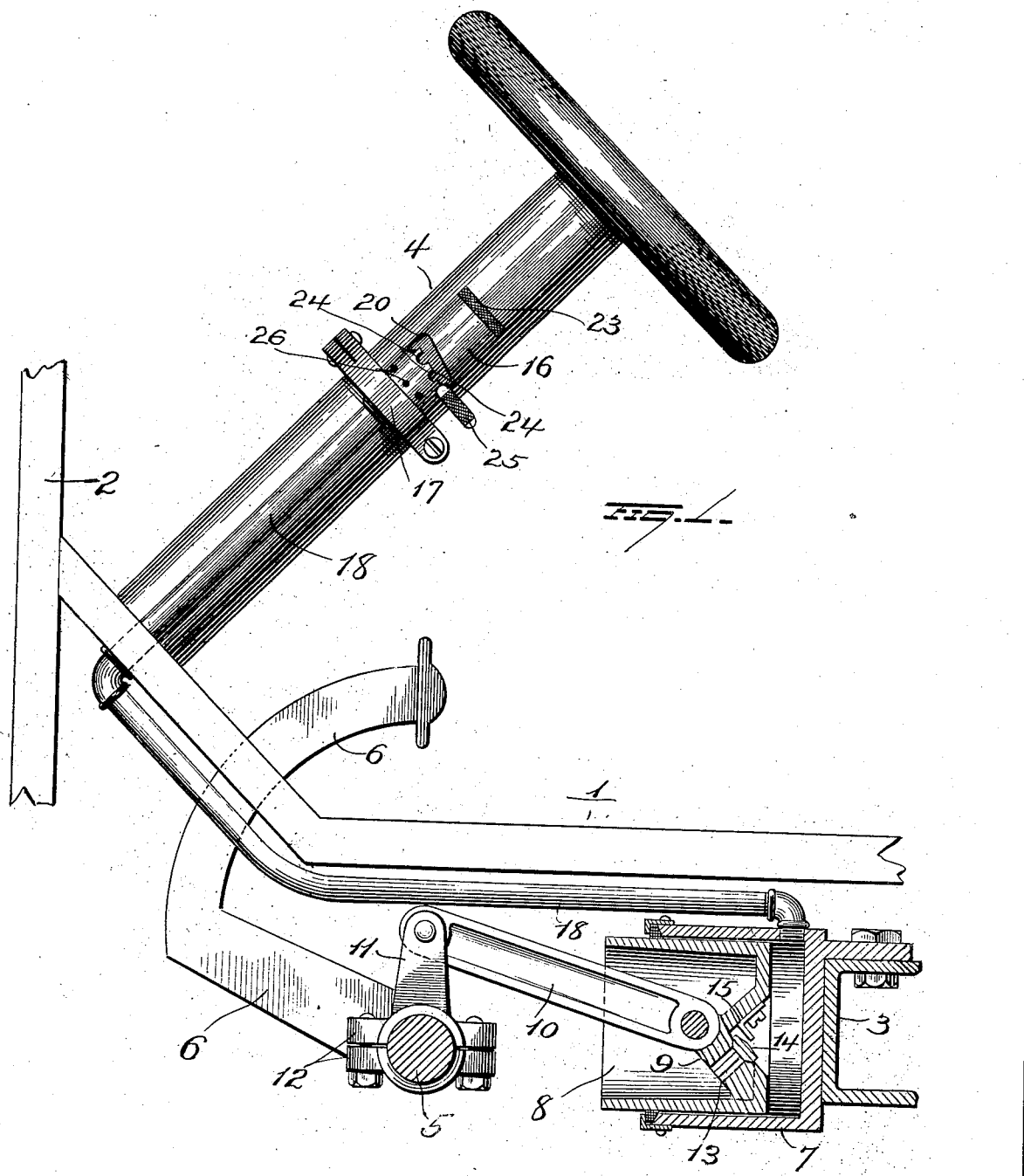

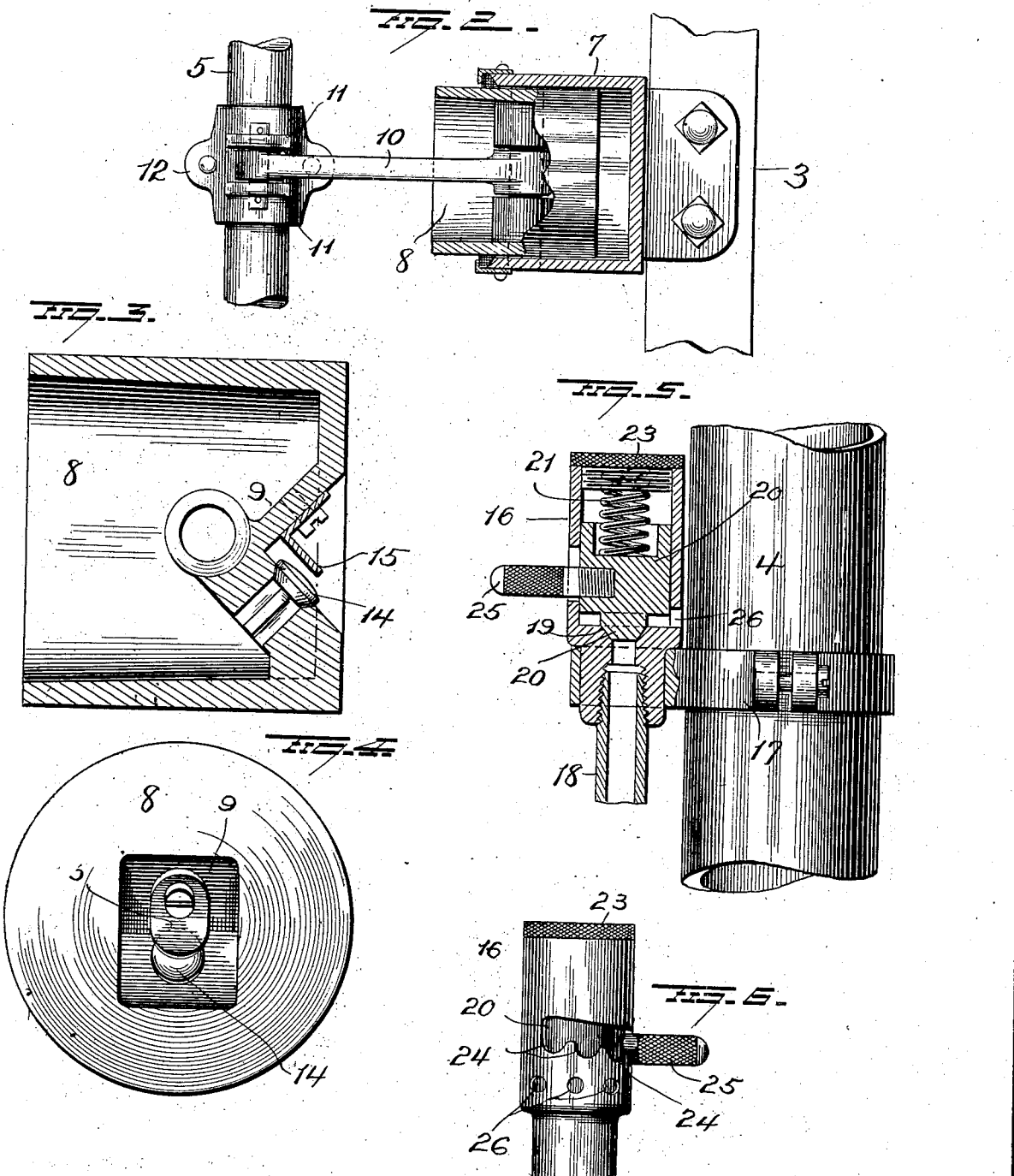

WILLIAM E. VILLINGER, OF WILLIAMSPORT, PENNSYLVANIA.

CLUTCH-CONTROLLING MEANS.

1,172,410.  Specification of Letters Patent.  Patented Feb. 22, 1916.

Application filed March 13, 1914. Serial No. 824,416.

*To all whom it may concern:*

Be it known that I, WILLIAM E. VILLINGER, of Williamsport, in the county of Lycoming and State of Pennsylvania, have invented certain new and useful Improvements in Clutch-Controlling Means; and I do hereby declare the following to be a full, clear, and exact description of the invention, such as will enable others skilled in the art to which it appertains to make and use the same.

This invention relates to improvements in clutch controlling means, and more particularly to appliances for controlling the operation of the driving clutch of automobiles or of other forms of power transmitting mechanisms.

In the operation of automobiles, it is necessary for the driver frequently (for the safe and proper control of his machine) to release the driving clutch. This is done by depressing what is known as the "clutch pedal". In actual practice it is found that unless the driver is careful and experienced and even with the most experienced and careful drivers, it sometimes happens that the foot slips off the clutch pedal with the result that the clutch engages too quickly and causes a consequent shock or jar to the machinery, slipping of the tires, etc.

The object of my invention is to provide means to prevent such results, and to so construct and arrange my improvements that the return of the clutch members to their engaging position shall be under the control of the driver and so that such return of the clutch to normal engaging position may be caused to be more or less gradual or prevented, as occasion may require.

With this object in view the invention consists in certain novel features of construction and combinations of parts as hereinafter set forth and pointed out in the claims.

In the accompanying drawings, Figure 1 is a fragmentary view in side elevation showing a portion of an automobile and the application of my improvements. Fig. 2 is a plan view, partly in section, showing the retarding device and its connection with the driving clutch shaft. Figs. 3 and 4 are views showing the piston of the retarding device. Fig. 5 is an enlarged view, partly in section showing the controlling valve for the retarding device and its application to the steering post, and Fig. 6 is a view in elevation of the controlling valve structure.

1 represents the foot-board of an automobile; 2 a portion of the dash-board, and 3 a transverse girder of the automobile frame. A steering post 4 of any approved construction is provided and this post serves to support a controlling valve as hereinafter more fully explained.

A driving clutch shaft is shown at 5 but the driving clutch *per se* constitutes no part of my present invention and may be of any approved construction. A foot lever 6 is secured to this shaft and terminates over the foot-board 1 within convenient reach of the driver.

A cylinder 7 is secured to the transverse girder 3 and within this cylinder a piston 8 is movable,—said cylinder and piston constituting a retarding device for the clutch shaft, as will now be fully explained. The piston 8 is provided at its closed end with an internal V-shaped enlargement 9 with which one end of a connecting rod 10 is pivotally attached,—the other end of said connecting rod being pivotally connected between the upper ends of arms 11 and these arms are secured to the clutch shaft by means of a clamp 12. One wall of the internal V-shaped enlargement 9 is provided with a duct 13, at one end of which a seat is formed for a valve 14 which is maintained closed when the piston moves toward the closed end of the cylinder but which is permitted to open when the piston moves in the opposite direction. The opening movement of the valve 13 is limited by means of a stop 15 secured to the other wall of the V-shaped enlargement 9.

A valve casing 16 is secured to the steering post 4 by means of a suitable clamp 17 and this valve casing is connected by means of a pipe 18 with the cylinder 7 at a point near the closed end of the latter. In other words the pipe 18 communicates with the cylinder 7 between the piston and the closed end of said cylinder. A seat 19 is formed in the lower portion of the valve casing 16 for a valve 20. This valve is capable of vertical movement within the casing 16 and is forced normally against its seat by means of a spring 21, the lower end of which bears against the valve and the upper end against the removable cap 23 of the casing. The valve casing 16 is provided in its wall with an elongated slot or opening 24, the lower wall or edge of which is made with a plurality of notches 24ª disposed in planes successively above each other and the slot itself is slightly diagonal. A pin or handle 25 is secured to the valve 20 and passes outwardly through the slot and this pin or handle may be caused to rest in any one of the diagonal series of notches 24ª. The valve casing 16 is also provided with a plurality of holes 26 for the escape of air. When the pin or handle 25 is in the lowermost notch of the casing, the valve 20 will be closed upon its seat 19 and there can be no escape of air from the cylinder 7.

In Fig. 1 of the drawings the parts are shown approximately mid-way between the ends of a stroke of the foot lever 6. Should the foot lever 6 be depressed to release the driving clutch the piston 8 would be permitted to move freely in the direction of the open end of the cylinder by reason of the passage of air through the check valve 14 into the chamber between the piston and the cylinder head. Should the foot lever be now released and the piston thus caused to move toward the closed end of the cylinder, the air in the cylinder and that in the pipe 18 would be compressed but as the valve 20 is closed and the springs of the clutch are not sufficient to force the piston completely to the end of the cylinder because of such compression of the air, the clutch would be prevented from closing, and hence, should the operator's foot accidently slip from the foot lever 6, the parts could not be returned to their normal positions and the driving clutch could not be operatively "thrown in". It is frequently desirable that the return of the foot lever and the consequent "throwing in" of the clutch shall be retarded or more or less gradual. This can be effected by manipulation of the valve 20. Should the driver desire that the return of the clutch shall be considerably retarded but permitted to engage, he will move the pin or handle 25 until it engages the next notch 24ª. This will cause the valve 20 to be raised slightly from its seat and permit air to escape slowly from the cylinder. By moving the handle 25 to the next higher notch the valve will be raised higher and a freer escape of air from the cylinder will be afforded. Should he desire that the foot lever 6 and the clutch shall return more promptly, he will move the pin or handle 25 to the next higher notch and thus fully open the valve 20 for the free escape of air from the cylinder 7.

While I have described my improvements as applied to an automobile, it is evident that they may be applied to the driving clutch of any power transmitting mechanism.

Slight changes might be made in the details of construction of my improvements without departing from the spirit of my invention or limiting its scope, and hence I do not desire to restrict myself to the precise details herein set forth.

Having fully described my invention what I claim as new and desire to secure by Letters-Patent, is:

1. The combination with an automobile frame, a steering post, and a clutch pedal, of a valveless cylinder immovably secured to said frame, said cylinder being closed at one end, a valved piston in said cylinder, a rod pivotally connected with the piston and with the clutch pedal, an adjustable valve secured to the steering post, and a rigid pipe communicating at one end with said valve and at the other end with the closed end of said immovably secured cylinder.

2. The combination with an automobile frame, a clutch shaft, a pedal secured to said shaft, and an arm secured to said shaft, of a cylinder rigidly secured to the frame and having one end open, a valved piston in said cylinder, a piston rod pivoted at one end to said piston and at the other end to the arm on the clutch shaft, an adjustable valve supported in the automobile and a rigid pipe connection between said valve and the closed end of said cylinder.

3. The combination with an automobile frame, a steering post, and a clutch pedal, of a cylinder rigidly secured to said frame, a valved piston in said cylinder, connecting devices between said piston and clutch pedal, a single rigid pipe communicating with the cylinder near the closed end thereof, a valve casing secured to the steering post and communicating with the free end of said fixed pipe, said casing having a slot provided with a plurality of notches located in different planes, a valve in said casing adapted to close said pipe, and a pin rigid with said valve and passing through the slot in the casing.

4. The combination with an automobile, a steering post, a clutch shaft and a foot lever secured to the latter, of a cylinder rigidly secured to the frame of the automobile, a piston in said cylinder, a valve in said piston adapted to close communication through the piston when the latter is moved toward the closed end of the cylinder and open such communication when the piston is moved in the opposite direction, an arm on the clutch shaft, a pitman connecting said arm with the piston, a single pipe connected with the cylinder near the closed end thereof, and a valve carried by the steering post and communicating with the free end of said pipe for controlling the passage of air through said pipe when the piston moves toward the closed end of the cylinder to control the retardation of the return of said foot lever and clutch shaft.

In testimony whereof, I have signed this specification in the presence of two subscribing witnesses.

WILLIAM E. VILLINGER.

Witnesses:
 H. A. VILLINGER,
 J. M. ROOK.